(12) United States Patent
Kobayashi

(10) Patent No.: US 6,914,188 B2
(45) Date of Patent: Jul. 5, 2005

(54) DVD PLAYER APPARATUS

(75) Inventor: Hiroshi Kobayashi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 10/791,690

(22) Filed: Mar. 3, 2004

(65) Prior Publication Data

US 2004/0226736 A1 Nov. 18, 2004

(30) Foreign Application Priority Data

Mar. 4, 2003 (JP) .................................. 2003-001071 U

(51) Int. Cl.⁷ .............................................. H02G 3/08
(52) U.S. Cl. ...................... 174/50; 174/17 R; 174/135; 174/63; 312/9.16
(58) Field of Search ..................... 174/135, 50, 17 R, 174/58, 63; D14/129; D6/635; 386/125; 312/9.16, 9.18; 206/308.1, 310

(56) References Cited

U.S. PATENT DOCUMENTS

| | | | |
|---|---|---|---|
| 6,374,040 B2 * | 4/2002 | Mizoguchi et al. | 386/125 |
| 6,433,274 B1 * | 8/2002 | Doss et al. | 174/50 |
| 6,452,108 B1 * | 9/2002 | Major | 174/135 |
| 6,454,091 B1 * | 9/2002 | Mendoza et al. | 206/308.1 |
| 6,578,935 B1 * | 6/2003 | Garretson et al. | 312/9.16 |
| D485,698 S * | 1/2004 | Yu | D6/407 |
| D486,457 S * | 2/2004 | Lee | D14/129 |
| D493,661 S * | 8/2004 | Yau | D6/635 |

FOREIGN PATENT DOCUMENTS

| | | |
|---|---|---|
| JP | 59-202691 | 11/1984 |
| JP | 62-188875 U | 12/1987 |

* cited by examiner

*Primary Examiner*—Dhiru R. Patel
(74) *Attorney, Agent, or Firm*—Morgan, Lewis & Bockius LLP

(57) ABSTRACT

A DVD player apparatus includes an inner housing formed of an iron plate, in which a player body is incorporated, having a top plate, left and right side walls, and a rear wall, a front side of the inner housing being open; a case for covering the inner housing, a front side of the case being open, the case having a top wall on which legs of a television set are placed; two left and right reinforcements provided projectingly inside the case on both sides of the front side of the inner housing; and downwardly projecting portions for abutting against the top plate at positions above the left and right side walls of the inner housing to receive the load, the downwardly projecting portions provided on lower surface sides of the left and right recesses on the back side of the top wall of the case.

8 Claims, 3 Drawing Sheets

RELATED ART

RELATED ART

DVD PLAYER APPARATUS

BACKGROUND OF THE INVENTION

1. Field of the Invention

The present invention relates to a Digital Video Disk (DVD) player apparatus capable of mounting a television set thereon.

2. Description of the Related Art

A first conventional technique is shown in FIGS. 3 and 4. This apparatus is comprised of a pair of first supporting plates 102 which are respectively hinged to both sides of the bottom surface of a television set 101 and are capable of rotating between an upright position and a folded position; a pair of second supporting plates 105 which are hinged thereto in a direction perpendicular to the hinging direction of the first supporting plates 102 and capable of rotating between two positions of an upright position and a folded position; and fixing means for hanging and fixing the second supporting plates 105 respectively to the first supporting plates 102 at the upright positions. A Video Tape Recorder (VTR) 108 is accommodated in a space formed by both supporting plates 102 and 105 at the upright positions of the first and second supporting plates 102 and 105, and the television set 101 is supported by the first supporting plates 102 at the folded positions. (Refer to JP-UM-A-62-188875, for example.)

With this technique, however, since the first supporting plates 102 and the second supporting plates 105 are fitted by hinges, both supporting plates 102 and 105, if positionally offset, can be haphazardly folded toward the inner side. Hence, there has been a problem in that there are times when the supporting state becomes unstable.

A second conventional technique is shown in FIGS. 5, 6, 7A, and 7B. A frame 201 is fitted in a resin molded housing 205. A plurality of cross ribs 206 are integrally molded on a front surface portion of inner walls of the housing, while a plurality of ribs for abutting against outer surfaces of the frame 201 are respectively formed integrally on a bottom surface and both side inner wall surfaces of the housing are formed in such a manner as to extend from the front end toward the rear end of the housing 205. At positions of the frame 205 opposing the cross ribs 206, round holes into which the cross ribs 206 are fitted are provided at some positions, while elongated holes having leeway in the horizontal direction are provided at the other positions. A plurality of ribs for abutting against outer surfaces of the frame 201 are integrally formed on both side inner wall surfaces of a back cover 210 in such a manner as to extend from a rear surface toward an opening end of the back cover 210. A plurality of ribs with U-shaped cross sections for abutting against outer surfaces of the frame 201 are integrally formed on inner wall surfaces of the back cover 210 in such a manner as to range from a bottom surface to a rear surface of the back cover 210. As the back cover 210 is secured to the housing 205, the frame 201 is clamped by the group of ribs and is fixed in position. (Refer to JP-A-59-202691, for example.)

However, the frame 201 is arranged to be fitted in the housing 205 of the television set, and the housing 205 of the television set is not mounted thereon.

SUMMARY OF THE INVENTION

An object of the invention is to provide a DVD player apparatus which makes it possible to fabricate a DVD set on a precondition that a television set is mounted thereon, and which has a rigid structure for making it possible to mount the television set in a stable state and receive the weight of the television set without an undue strain.

The invention has been devised to overcome the above-described problems, and in accordance with a first aspect of the invention there is provided a DVD player apparatus including: an inner housing, in which a player body is incorporated and which is formed of an iron plate that serves as a shield plate, having a top plate, left and right side walls, and a rear wall, a front side of the inner housing being open; a case for covering the inner housing, a front side of the case being open, the case having a top wall on which recesses for placing legs of a television set are provided at four positions on front and back sides thereof; two left and right reinforcements, which are formed in a shape of square columns and whose upper ends are located in the vicinity of the top wall of the case and are closed, provided uprightly inside the case on both sides of the front side of the inner housing; cabinet latching/attaching pieces for latching a front cabinet, which is attached to the front side of the case, respectively provided projectingly on the left and right reinforcements in such a manner as to be oriented forward; and downwardly projecting portions for abutting against the top plate at positions above the left and right side walls of the inner housing to receive the load, the downwardly projecting portions provided on lower surface sides of the left and right recesses on the back side of the top wall of the case.

In accordance with a second aspect of the invention there is provided a DVD player apparatus including: an inner housing, in which a player body is incorporated and which is formed of an iron plate that serves as a shield plate, having a top plate, left and right side walls, and a rear wall, a front side of the inner housing being open; a case for covering the inner housing, a front side of the case being open, the case having a top wall on which legs of a television set are placed; two left and right reinforcements provided projectingly inside the case on both sides of the front side of the inner housing; and downwardly projecting portions for abutting against the top plate at positions above the left and right side walls of the inner housing to receive the load, the downwardly projecting portions provided on lower surface sides of the left and right recesses on the back side of the top wall of the case.

In accordance with a third aspect of the invention, downwardly oriented reinforcing ribs for abutting against the top plate and the left and right reinforcements are provided on the lower surface sides of the left and right recesses on the front side of the top wall.

In accordance with a fourth aspect of the invention, each of the downwardly projecting portions is formed in a hollow elongated circular shape extending in a left-and-right direction, one end portion of the downwardly projecting portion is located on a lower side of the recess, while another end portion thereof is located on an upper side of a corner of the side wall of the inner housing.

BRIEF DESCRIPTION OF THE DRAWINGS

FIGS. 1A and 1B illustrate a DVD player apparatus in accordance with an embodiment, in which FIG. 1A is a plan view thereof, and FIG. 1B is a front elevational view thereof;

FIGS. 7A and 7B illustrate an internal structure of the apparatus, in which FIG. 7A is a side sectional view thereof, and FIG. 7B is a plan sectional view thereof.

DETAILED DESCRIPTION OF THE PREFFERED EMBODIMENTS

Figure 1A:
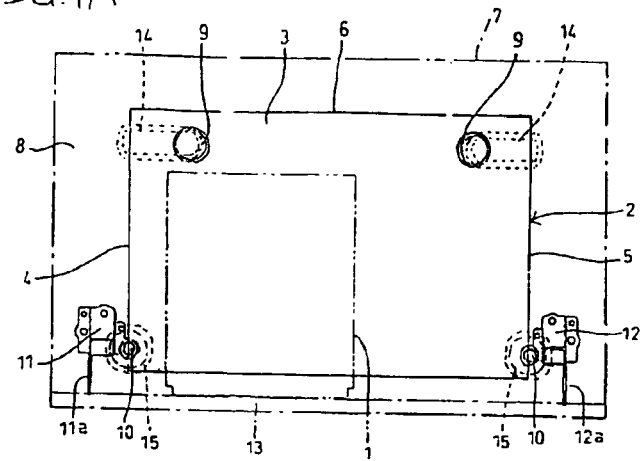

Referring now to the drawings, a description will be given of an embodiment of a DVD player apparatus in accordance with the invention.

Figure 1B:
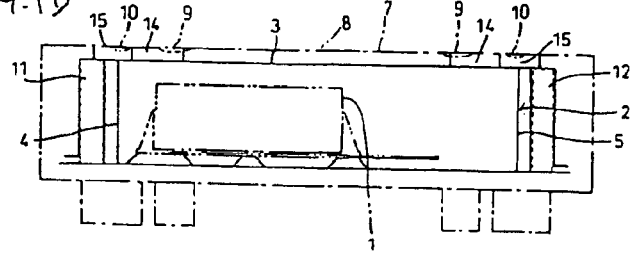
Figure 2:
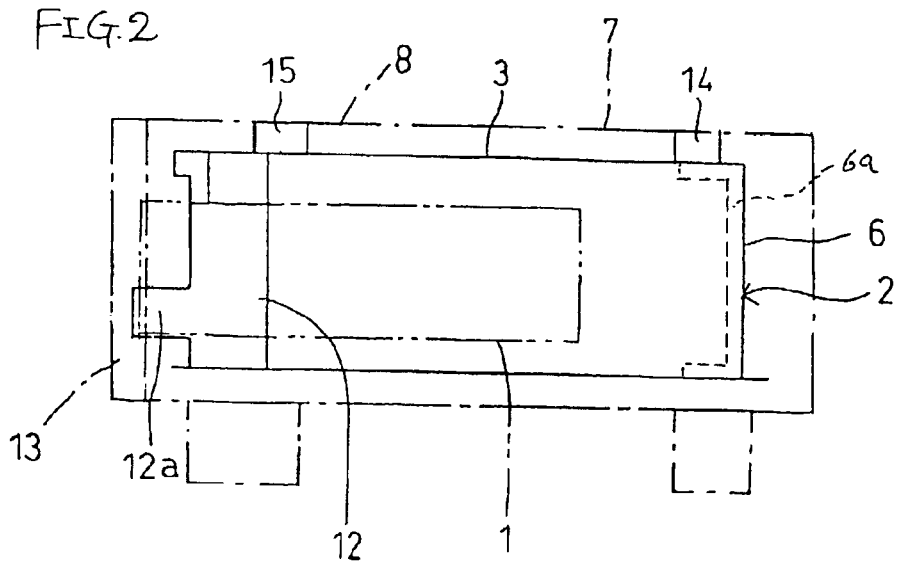
FIG. 2 is a side elevational view of the apparatus.
Figure 3:
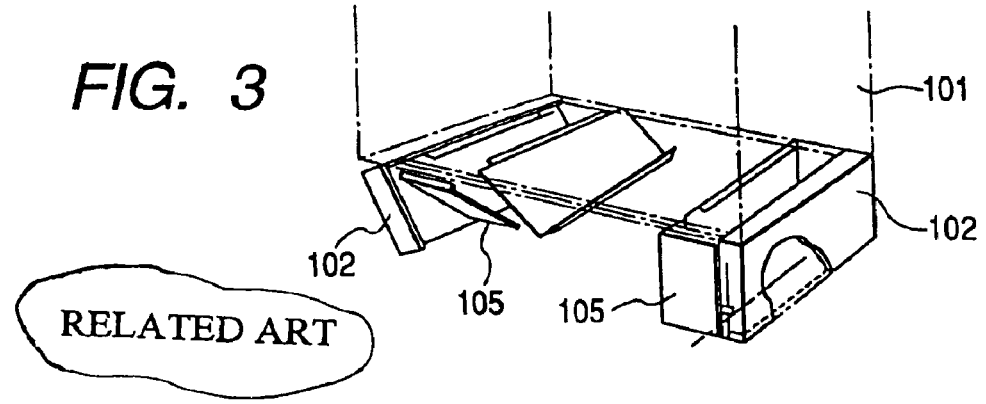
FIG. 3 is a partial perspective view illustrating a conventional integral cabinet of a television receiver for accommodating a VTR.
Figure 4:
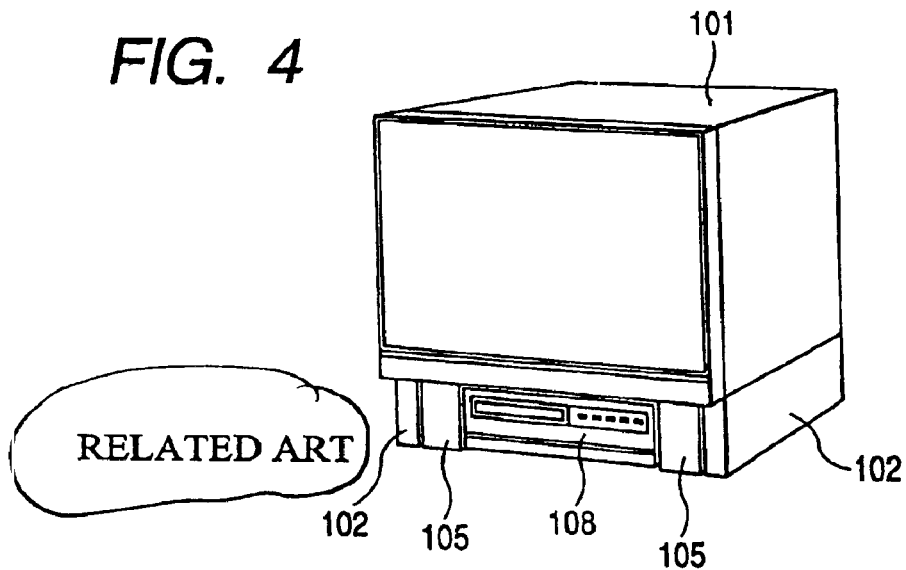
FIG. 4 is a perspective view of the cabinet at the time of accommodating the VTR.
Figure 5:
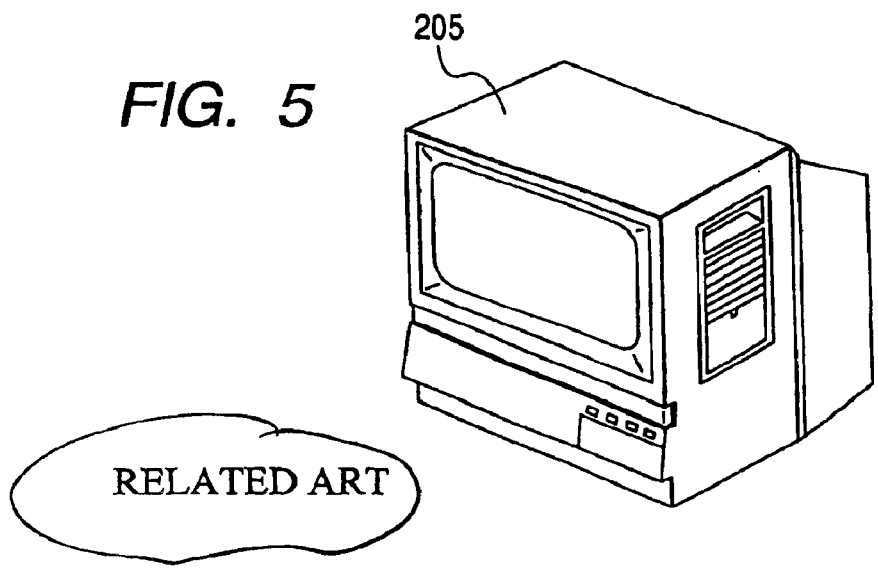
FIG. 5 is a perspective view illustrating a conventional housing apparatus.
Figure 6:
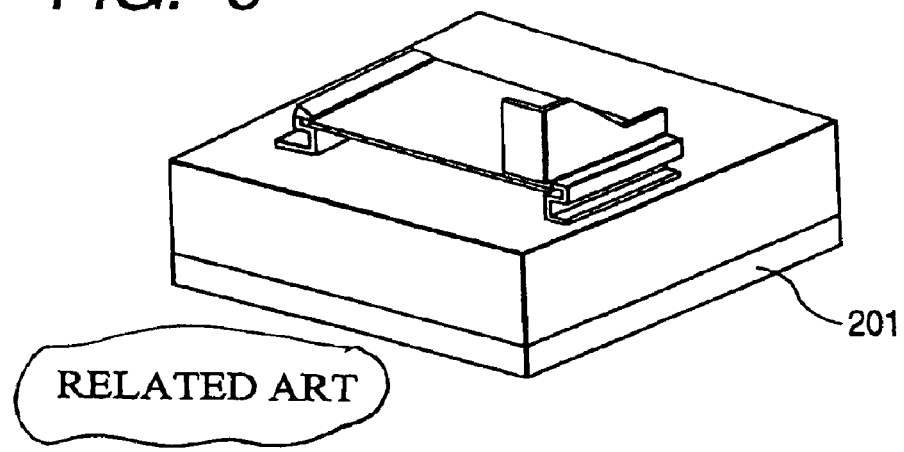
FIG. 6 is a perspective view of a frame used in the apparatus.
Figure 7A:
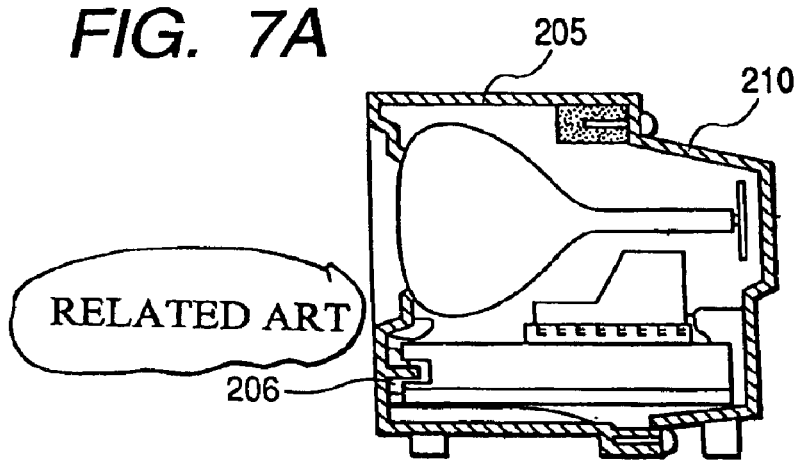
Figure 7B:
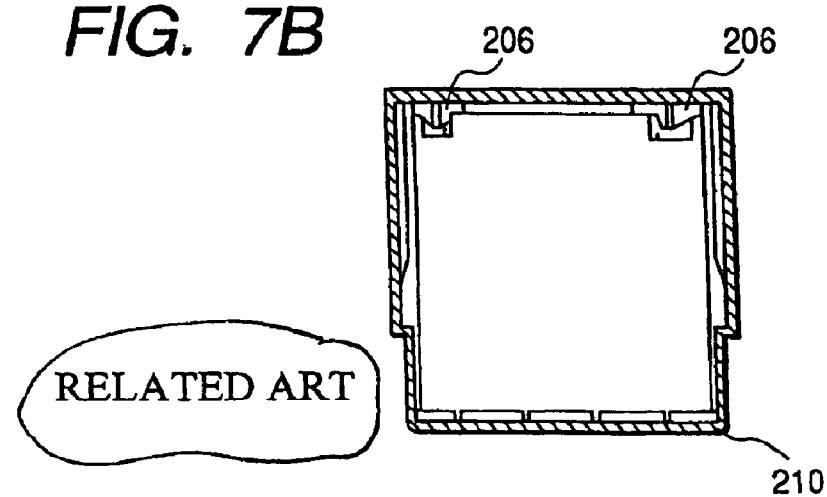

FIGS. 1A and 1B show the DVD player apparatus in accordance with the embodiment, in which FIG. 1A is a plan view thereof, and FIG. 1B is a front elevational view thereof. FIG. 2 is a side elevational view of the apparatus.

As shown in FIGS. 1A, 1B, and 2, in the DVD player apparatus in according to this embodiment, an inner housing 2 in which a player body 1 is incorporated is formed of an iron plate which also serves as a shield plate. This inner housing 2 is made up by a top plate 3, left and right side walls 4 and 5, and a rear wall 6, and its front side is open. This inner housing 2 is covered by a case 7 whose front side is open. Substantially spherical recesses 9 and 10 for placing legs (not shown) of a television set are provided at four positions on the front and back sides of a top wall 8 of this case 7. Two left and right reinforcements 11 and 12, which are formed in the shape of square columns and whose upper ends are located in the vicinity of the top wall of the case 7 and are closed, are provided uprightly inside the case 7 on both sides of the front side of the inner housing 2.

As shown in FIG. 2, a reinforcing member 6a having a U-shaped cross section is attached on inner side of the rear wall 6 to enhance the rigidity of the inner housing 2.

Cabinet latching/attaching pieces 11a and 12a for latching a front cabinet 13, which is attached to the front side of the case 7, are respectively provided projectingly on the left and right reinforcements 11 and 12 in such a manner as to be oriented forward. Two downwardly projecting portions 14 for abutting against the top plate 3 at positions above the left and right side walls 4 and 5 of the inner housing 2 to receive the load are provided on the lower surface sides of the left and right recesses 9 on the back side of the case 7.

Further, two downwardly oriented reinforcing ribs 15 for abutting against the top plate 3 and reinforcements 11 and 12 at positions above the left and right side walls of the inner housing 2 are provided on the lower surface sides of the left and right recesses 10 on the front side of the case 7.

Each downwardly projecting portion 14 is formed in a hollow elongated circular shape extending in the left-and-right direction. Each reinforcing rib 15 is formed in a hollow cylindrical shape. The downwardly projecting portions 14 and reinforcing ribs 15 are integrally formed with the case 7 by injection molding of a resin. Each of the downwardly projecting portions 14 and reinforcing ribs 15 does not have a corner or an edge, so that stress concentration is prevented from occurring. Also, each of the downwardly projecting portions 14 and reinforcing ribs 15 is formed into a hollow shape to have a thin wall, so that surface sink is prevented from occurring.

The legs of the television set are adapted to enter the substantially spherical recesses 9 and 10 at four positions on the front and back sides of the top wall 8 of the case 7. The weight of this television set is supported as the downwardly projecting portions 14 of the top wall 8 of the case 7 abut against the top plate 3 of the inner housing 2, and the downwardly oriented reinforcing ribs 15 abut against the top plate 3 of the inner housing 2 and reinforcements 11 and 12, so that the structure is made rigid.

Accordingly, in accordance with this embodiment, it is possible to fabricate a DVD set on a precondition that a television set is mounted thereon, and the apparatus can be provided with a rigid structure for making it possible to mount the television set in a stable state and receive the weight of the television set without an undue strain.

As described above, in accordance with the first aspect of invention, the DVD player apparatus includes: an inner housing, in which a player body is incorporated and which is formed of an iron plate that serves as a shield plate, having a top plate, left and right side walls, and a rear wall, a front side of the inner housing being open; a case for covering the inner housing, a front side of the case being open, the case having a top wall on which recesses for placing legs of a television set are provided at four positions on front and back sides thereof; two left and right reinforcements, which are formed in a shape of square columns and whose upper ends are located in the vicinity of the top wall of the case and are closed, provided uprightly inside the case on both sides of the front side of the inner housing; cabinet latching/attaching pieces for latching a front cabinet, which is attached to the front side of the case, respectively provided projectingly on the left and right reinforcements in such a manner as to be oriented forward; and downwardly projecting portions for abutting against the top plate at positions above the left and right side walls of the inner housing to receive the load, the downwardly projecting portions provided on lower surface sides of the left and right recesses on the back side of the top wall of the case. Therefore, the following advantages are offered.

Namely, the legs of the television set are adapted to enter the substantially spherical recesses at four positions on the front and back sides of the top wall of the case. The weight of this television set is supported as the downwardly projecting portions of the top wall of the case abut against the top plate above the left and right side walls of the inner housing, and the downwardly oriented reinforcing ribs abut against the top plate. Further, the weight of the television set is received by the left and right reinforcements, so that the structure is made rigid. Therefore, it is possible to fabricate a DVD set on a precondition that a television set is mounted thereon, and the apparatus can be provided with a rigid structure for making it possible to mount the television set in a stable state and receive the weight of the television set without an undue strain.

In accordance with the second aspect of invention, the DVD player apparatus includes: an inner housing, in which a player body is incorporated and which is formed of an iron plate that serves as a shield plate, having a top plate, left and right side walls, and a rear wall, a front side of the inner housing being open; a case for covering the inner housing, a front side of the case being open, the case having a top wall on which legs of a television set are placed; two left and right reinforcements provided projectingly inside the case on both sides of the front side of the inner housing; and downwardly projecting portions for abutting against the top plate at positions above the left and right side walls of the inner housing to receive the load, the downwardly projecting portions provided on lower surface sides of the left and right recesses on the back side of the top wall of the case. Therefore, the following advantages are offered.

Namely, the legs of the television set are adapted to enter the substantially spherical recesses at four positions on the front and back sides of the top wall of the case. The weight of this television set is supported as the downwardly projecting portions of the top wall of the case abut against the top plate of the inner housing. Further, the weight of the television set is received by the left and right reinforcements, so that the structure is made rigid. Therefore, it is possible to fabricate a DVD set on a precondition that a television set is mounted thereon, and the apparatus can be provided with a rigid structure for making it possible to mount the television set in a stable state and receive the weight of the television set without an undue strain.

In accordance with the third aspect of the invention, downwardly oriented reinforcing ribs for abutting against the top plate and the left and right reinforcements are provided on the lower surface sides of the left and right recesses on the front side of the top wall. Therefore, the weight of the television set can be received by these downwardly oriented reinforcing ribs as well, so that the television set can be mounted in a more stable state.

In accordance with the fourth aspect of the invention, each of the downwardly projecting portions is formed in a hollow elongated circular shape extending in a left-and-right direction, one end portion of the downwardly projecting portion is located on a lower side of the recess, while another end portion thereof is located on an upper side of a corner of the side wall of the inner housing. Therefore, the weight applied to the legs of the television set which entered the recesses can be received in a dispersed manner by these downwardly projecting portions. As the other end portions are supported by the respective side walls of the inner housing, it is possible to prevent the case from becoming partially collapsed due to the weight of the television set.

What is claimed is:

1. A DVD player apparatus comprising:
    an inner housing, in which a player body is incorporated and which is formed of an iron plate that serves as a shield plate, having a top plate, left and right side walls, and a rear wall, a front side of the inner housing being open;
    a case for covering the inner housing, a front side of the case being open, the case having a top wall on which recesses for placing legs of a television set are provided at four positions on front and back sides thereof;
    two left and right reinforcements, which are formed in a shape of square columns and whose upper ends are located in the vicinity of the top wall of the case and are closed, provided uprightly inside the case on both sides of the front side of the inner housing;
    cabinet latching/attaching pieces for latching a front cabinet, which is attached to the front side of the case, respectively provided projectingly on the left and right reinforcements in such a manner as to be oriented forward; and
    downwardly projecting portions for abutting against the top plate at positions above the left and right side walls of the inner housing to receive the load, the downwardly projecting portions provided on lower surface sides of the left and right recesses on the back side of the top wall of the case.

2. The DVD player apparatus according to claim 1, wherein downwardly oriented reinforcing ribs for abutting against the top plate and the left and right reinforcements are provided on the lower surface sides of the left and right recesses on the front side of the top wall.

3. A DVD player apparatus comprising:
    an inner housing, in which a player body is incorporated and which is formed of an iron plate that serves as a shield plate, having a top plate, left and right side walls, and a rear wall, a front side of the inner housing being open;
    a case for covering the inner housing, a front side of the case being open, the case having a top wall on which legs of a television set are placed;
    two left and right reinforcements provided projectingly inside the case on both sides of the front side of the inner housing; and
    downwardly projecting portions for abutting against the top plate at positions above the left and right side walls of the inner housing to receive the load, the downwardly projecting portions provided on lower surface sides of the left and right recesses on the back side of the top wall of the case.

4. The DVD player apparatus according to claim 3, wherein the top wall of the case has recesses for placing the legs of the television set, which are provided at four positions on front and back sides thereof.

5. The DVD player apparatus according to claim 4, wherein downwardly oriented reinforcing ribs for abutting against the top plate and the left and right reinforcements are provided on the lower surface sides of the left and right recesses on the front side of the top wall.

6. The DVD player apparatus according to claim 5, wherein the downwardly projecting portions and the downwardly oriented reinforcing ribs are integrally formed with the case.

7. The DVD player apparatus according to claim 5, wherein each of the downwardly projecting portions and the downwardly oriented reinforcing ribs does not have a corner or an edge.

8. The DVD player apparatus according to claim 3, wherein each of the downwardly projecting portions is formed in a hollow elongated circular shape extending in a left-and-right direction, one end portion of the downwardly projecting portion is located on a lower side of the recess, while another end portion thereof is located on an upper side of a corner of the side wall of the inner housing.

* * * * *